United States Patent
Jim et al.

(10) Patent No.: US 7,159,032 B2
(45) Date of Patent: Jan. 2, 2007

(54) METHOD FOR PREVENTION OF RECURSIVE LOOPS BETWEEN NETWORK ELEMENTS

(75) Inventors: Trevor Jim, Princeton, NJ (US); Dan Suciu, Seattle, WA (US)

(73) Assignee: AT&T Corporation, New York, NY (US)

( * ) Notice: Subject to any disclaimer, the term of this patent is extended or adjusted under 35 U.S.C. 154(b) by 715 days.

(21) Appl. No.: 09/951,410

(22) Filed: Sep. 14, 2001

(65) Prior Publication Data

US 2002/0049761 A1    Apr. 25, 2002

Related U.S. Application Data

(60) Provisional application No. 60/253,786, filed on Nov. 29, 2000, provisional application No. 60/232,943, filed on Sep. 15, 2000.

(51) Int. Cl.
*G06F 15/173* (2006.01)
*G06F 7/00* (2006.01)
*G01R 31/28* (2006.01)

(52) U.S. Cl. .................. 709/238; 709/225; 709/244

(58) Field of Classification Search ............... 709/225, 709/217, 238, 244; 714/717
See application file for complete search history.

(56) References Cited

U.S. PATENT DOCUMENTS

| | | | | |
|---|---|---|---|---|
| 5,889,847 A | * | 3/1999 | Copley et al. | 379/229 |
| 6,021,427 A | * | 2/2000 | Spagna et al. | 709/206 |
| 6,327,587 B1 | * | 12/2001 | Forster | 707/2 |
| 6,505,228 B1 | * | 1/2003 | Schoening et al. | 718/106 |
| 2002/0120581 A1 | * | 8/2002 | Schiavone et al. | 705/64 |

OTHER PUBLICATIONS

IEEE, ANSI/IEEE Std 802.1D, Dec. 1998, IEEE, ANSI/IEEE Std 802.1D, pp. 58-109.*
Cisco, Understanding Spanning-Tree Protocol, 1989-1997, Cisco Systems, pp. 1-8.*
IEEE, ANSI/IEEE Std 802.1D, Dec. 1998, IEEE, ANSI Std 802.1D, pp. 58-109.*

* cited by examiner

*Primary Examiner*—Rupal Dharia
*Assistant Examiner*—Brian J. Gillis
(74) *Attorney, Agent, or Firm*—Robert S. M. Gorman; Gorman Law Offices

(57) ABSTRACT

The occurrence of recursive loops between network elements are detected and prevented. One or more queries are generated that are sent between the network elements. One or more of the network elements detect the imminent occurrence of a recursive loop between the network elements, and prevent the recursive loop by generating an intensional answer in response to the query. The intensional answer contains rules.

17 Claims, 3 Drawing Sheets

METHOD FOR PREVENTION OF RECURSIVE LOOPS BETWEEN NETWORK ELEMENTS

CROSS REFERENCE TO RELATED APPLICATIONS

This application claims the benefit of U.S. provisional application No. 60/232,943 filed on Sep. 15, 2000, and U.S. Provisional Application No. 60/253,786 filed on Nov. 29, 2000, the disclosures of which are incorporated herein by reference in their entirety.

TECHNICAL FIELD

The present invention relates to the field of networks. More specifically, the present invention relates to methods and preventing recursive loops between network elements.

BACKGROUND OF THE INVENTION

Elements in a network often have to send requests, or queries, to another network element or elements to discover needed information. The other network element sends an answer in response to the query. Sometimes, in order to construct this answer the other network element must itself send queries to additional network elements. This process may repeat until the original network element receives such a query, and this can result in an endless loop of queries. For example, network element A may send a query to network element B asking which network users are allowed access to particular data. Network element B may know that users 1–3 are allowed to have access and that any users that network element C authorizes are also allowed to have access. Network element B may then query network element C, so that it can respond to network element A with the full list of users who are allowed access. Network element C may know that users authorized by network element A should be allowed access, so network element C may query network element A so that it can respond to network element B with the full list of users who are allowed access. At this point, network element A is tasked with answering the very same query that provoked the sequence of queries just described. If network element A continues as before and queries network element B, an endless loop of queries may be generated.

SUMMARY OF THE INVENTION

Embodiments of the present invention detect and prevent the occurrence of recursive loops between network elements. One or more queries are generated that are sent between the network elements. One or more of the network elements detect the imminent occurrence of a recursive loop between the network elements, and prevent the recursive loop by generating an intensional answer in response to the query. The intensional answer contains rules.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
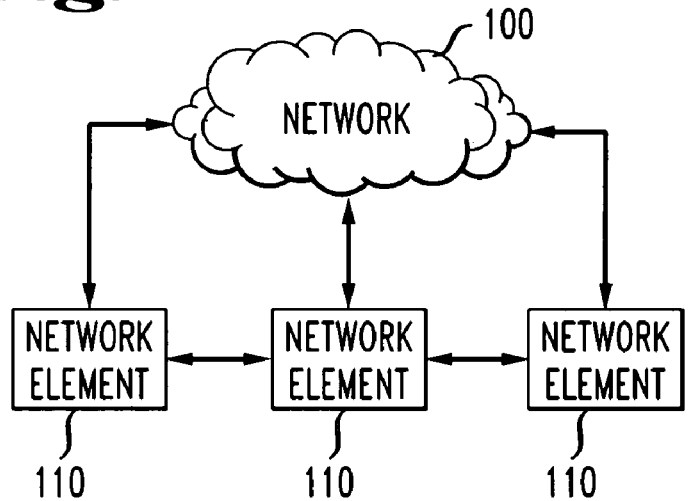
FIG. 1 is a block diagram of a network in accordance with an embodiment of the present invention.

FIG. 1 is a block diagram of a network 100 according to an exemplary embodiment of the present invention. The network 100 may include network elements 110 in accordance with an embodiment of the present invention.

According to the present invention, the network 100 may be any type of network, such as a local area network (LAN), a wide area network (WAN), an intranet, the Internet, etc. The network elements 110 may be any type of network element, such as a personal computer, a server, a PDA (personal digital assistant), a communications device such as a phone or pager, etc.

The network 100 and the network elements 110 are connected in a wired or wireless manner. As shown in FIG. 1, the network elements 110 may be directly connected to each other. While FIG. 1 illustrates three network elements 110, any number of network elements may be used with embodiments of the present invention. Additionally, the network 100 and network elements 110 may be connected to other networks not shown in FIG. 1.

Any of the network elements 110 may include a memory, such as RAM, ROM, etc., and a processor or CPU able to process instructions contained in the memory or processor in a known manner. The network elements 110 may communicate directly with each other or through the network 100.

Elements in the network 100 may have to send requests, or queries, to another network element or elements 110 to discover needed information. The other network element 110 may need to send queries of its own in order to answer these queries. For example, a first network element 110 may send a query to a second network element 110 asking which network users are allowed access to particular data. The second network element 110 may send a query to a third network element 110 asking what users are allowed access, so that it can answer the first network element 110. The third network element 110 may defer to the first network element 110, and therefore send a query to the first network element 110 asking which users are allowed access. If the first network element 110 continues as before and sends the second network element 110 a query asking which users are allowed access, an endless recursive loop of queries can result.

Embodiments of the present invention detect when such a recursive loop will be or is generated and prevents or solves such a recursive loop. In particular, the network elements 110 are programmed to detect the imminent or actual occurrence of such a recursive loop. Such programming can occur, for example, through programming instructions executed by processors or other elements contained within any of the network elements 110. After detecting that such a recursive loop will occur, the network element 110 prevents the occurrence or continuation of the recursive loop by generating an intensional answer in response to the query by one of the network elements 110, and forwarding the intensional answer to the querying network element. Such an intensional answer is defined and further explained below.

Answers generally forwarded by network elements in response to queries are extensional answers. Such extensional answers contain only data, and can lead to the generation of a recursive loop as described above. In contrast, an intensional answer as used with embodiments of the invention, is defined to be an answer that contains rules, which may be in addition to data contained in the answer. For example, if a network element has rules, such as a program, relevant to an answer to a received query, the network element will include the rules, or even include the entire program, in its answer. The rules can be used by the network element receiving the intensional answer in further determination of an answer so as to avoid the generation of a recursive loop.

Embodiments of the invention may have particular usefulness in distributed database systems, where information may be distributed at separate elements within a network. These types of distributed database systems may include distributed programs, where elements within a network each have separate parts of a program that become needed by other network elements.

Embodiments of the invention may also have particular usefulness in areas of security and security infrastructures, such as public key directories and distributed directories of security policies. For example, a particular network element 110 may query a second network element 110 about which network users are allowed to have access to particular data. An example is described below.

Alice and Bob may be administrators for two different distributed systems, that may be connected through a network, such as an intranet, LAN, WAN, the Internet, etc. Each may have policies within their systems about which users are allowed to have access to particular data, where the policies are programmed into network elements. For example, Alice may indicate that Alice, Bob and Claire are privileged users allowed to have access to particular data, and that anyone that Bob says is privileged is also regarded by Alice as privileged. This may be defined in a program on Alice's network element as follows:

Alice$Privileged(Alice):-;
Alice$Privileged(Bob):-;
Alice$Privileged(Claire):-;
Alice$Privileged(x):-Bob$Privileged(x);

This notation is a variant of Datalog/Prolog notation. Each line is a rule, with requirements to the right of the symbol :- and conclusions to the left. Rules with no requirements (the first three rules) are known as facts. The last rule indicates that Alice may need to query Bob to determine who is a privileged user. The same example can easily be written in the notation of other standard languages, such as SQL.

Similarly, Bob may say that Alice, Bob and Dan are privileged, and anyone that Alice says is privileged is also regarded as privileged by Bob. This information would be programmed into Bob's network element. This may be shown as follows:

Bob$Privileged(Alice):-;
Bob$Privileged(Bob):-;
Bob$Privileged(Dan):-;
Bob$Privileged(x):-Alice$Privileged(x);

Now if Ed's network element needs to know who Bob thinks is privileged, Ed's network element will generate a query to Bob's network element as follows:

Bob$Privileged(x)?

Bob's network element will attempt to generate an answer. Because Bob's rules indicate that anyone that Alice says is privileged is regarded as privileged by Bob, Bob's network element will generate a query asking Alice's network element who is privileged and send it to Alice's network element. The query may look as follows:

Alice$Privileged(x)?

Alice's network element will examine the query and rules programmed into the network element. In accordance with the invention Alice's network element is programmed to detect that a recursive loop may be generated. When Alice's network element looks at the rules, it determines that because the rules refer to Bob, a recursive loop will be generated if a new query is generated asking Bob's network element who is privileged as follows:

Bob$Privileged(x)?

Therefore, in accordance with the invention, Alice's network element is programmed to not ask that query which would result in a recursive loop, but to instead generate an intensional answer including all rules to send to Bob's network element to prevent the occurrence of the recursive loop. That intensional answer sent to Bob's network element may appear as follows:

Alice$Privileged (Alice):-;
Alice$Privileged(Bob):-;
Alice$Privileged(Claire):-;
Alice$Privileged(x):-Bob$Privileged(x);

Because Bob's network element has his rules and the rules from Alice's network element, he can figure out the answer to Ed's network element query (using standard techniques) and send an answer to Ed's network element that may appear as follows:

Bob$Privileged(Alice):-;
Bob$Privileged(Bob):-;
Bob$Privileged(Claire):-;
Bob$Privileged(Dan):-;

The answer sent by Bob's network element contains data (facts) only and is therefore an extensional answer. The answer that is generated by Alice's network element, as described above, contains both data and (non-fact) rules and therefore is an intensional answer. The recursive loop is thus detected dynamically. In the example described above, Alice's network element does not determine that a recursion is present until receipt of the query from Bob's network element. Thus, even if the rules of one or more of the network elements are changed, the recursion and imminent generation of the recursive loop are detected and an intensional answer is generated and sent.

A second example illustrates a situation where more than two network elements are involved. Ed's network element may send a query to Alice's network element as follows:

Alice$Privileged(x)? (Ed)

This query includes a list of "interested parties" or parties "involved in" the query. In this particular example, Ed is the only party (network element) involved in the query. Suppose Alice has these rules:

Alice$Privileged (Alice):-;
Alice$Privileged(x):-Bob$Privileged(x);

To answer the query from Ed's network element, Alice's network element may send the following query to Bob's network element:

Bob$Privileged(x)? (Alice, Ed)

Alice's query says that not only is Alice involved in the query, but so is Ed, since the new query is being asked in order to answer the first query from Ed. Suppose Bob's network element may has the following rules:

Bob$Privileged(Bob):-;
Bob$Privileged (x):-Claire$Privileged(x);

To answer the query from Alice's network element, Bob's network element sends this query to Claire's network element:

Claire$Privileged(x)? (Bob, Alice, Ed)

Figure 2:
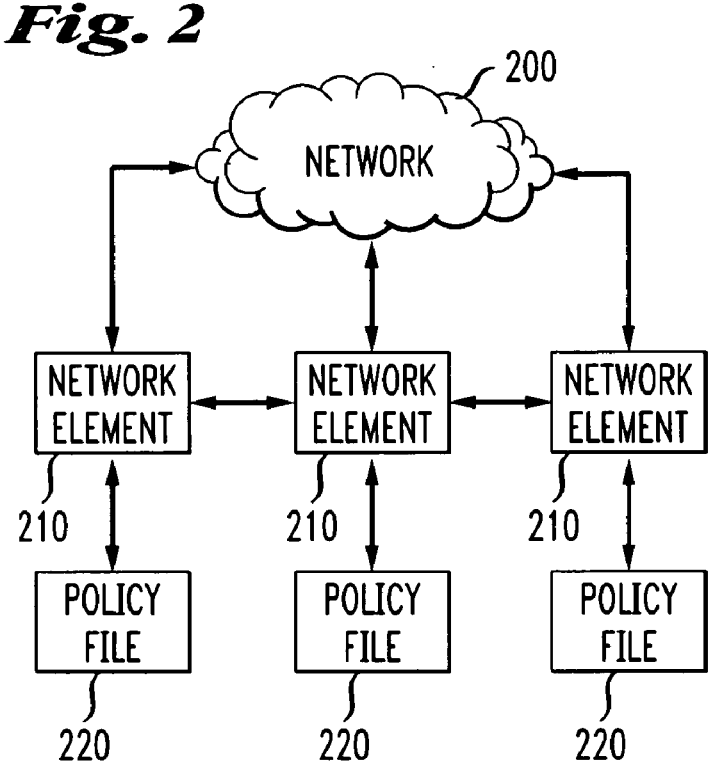
FIG. 2 illustrates a block diagram of a network in accordance with an embodiment of the present invention.

This query notes that Bob, Alice, and Ed are all involved in the query. Claire may have the following rules Claire$Privileged(Claire):-;
Claire$Privileged(x):-Alice$Privileged(x);

To answer the query from Bob's network element, Claire's network element would normally ask Alice's network element a query, "Alice$Privileged(x)?". However, this might cause a loop, because Bob's query to Claire shows that Alice is involved in the chain of queries. Claire's network element detects that Alice's network element is involved in the chain of queries. In accordance with the invention, Claire's network element detects this potential loop and thus does not send the query to Alice's network element. Instead, Claire returns to Bob an intensional answer as follows:

Claire$Privileged(Claire):-;
Claire$Privileged(x):-Alice$Privileged (x);

Bob's network element now has all of his rules and all of Claire's rules available to answer the query of Alice to Bob. Bob's and Claire's rules together indicate that Bob should ask Alice a query "Alice$Privileged(x)?". However, once again, this is a potential loop: Bob knows that the query Bob is trying to answer involves Alice, so he should not ask Alice a query. Bob thus returns an intensional answer to Alice as follows:

Bob$Privileged(Bob):-;
Bob$Privileged(x):-Claire$Privileged(x)
Claire$Privileged(Claire):-;
Claire$Privileged(x):-Alice$Privileged(x);

Now, Alice's network element has all of Bob's rules, Claire's rules, and Alice's rules. These rules are recursive but can be solved with known techniques. Now Alice's network element can answer the original query from Ed's network element as follows:

Alice$Privileged(Alice):-;
Alice$Privileged(Bob):-;
Alice$Privileged(Claire):-;

FIG. 2 illustrates a network 200 and network elements 210 similar to the corresponding elements illustrated in FIG. 1. Like the network elements 110 illustrated in FIG. 1, any or all of the network elements 210 illustrated in FIG. 2 can be programmed as described above to detect a recursion and to generate an intensional answer in response to a query from any of the other network elements. In addition, each of the network elements 210 is connected to a policy file 220, which may contain policies or rules unique to the network element. Upon receiving a query, a network element 210 may consult or communicate the corresponding policy file 220 when forming an answer, to determine rules or facts contained in the policy file. Otherwise, the network elements 210 will function in the same manner as network elements 110 described above.

Figure 3:
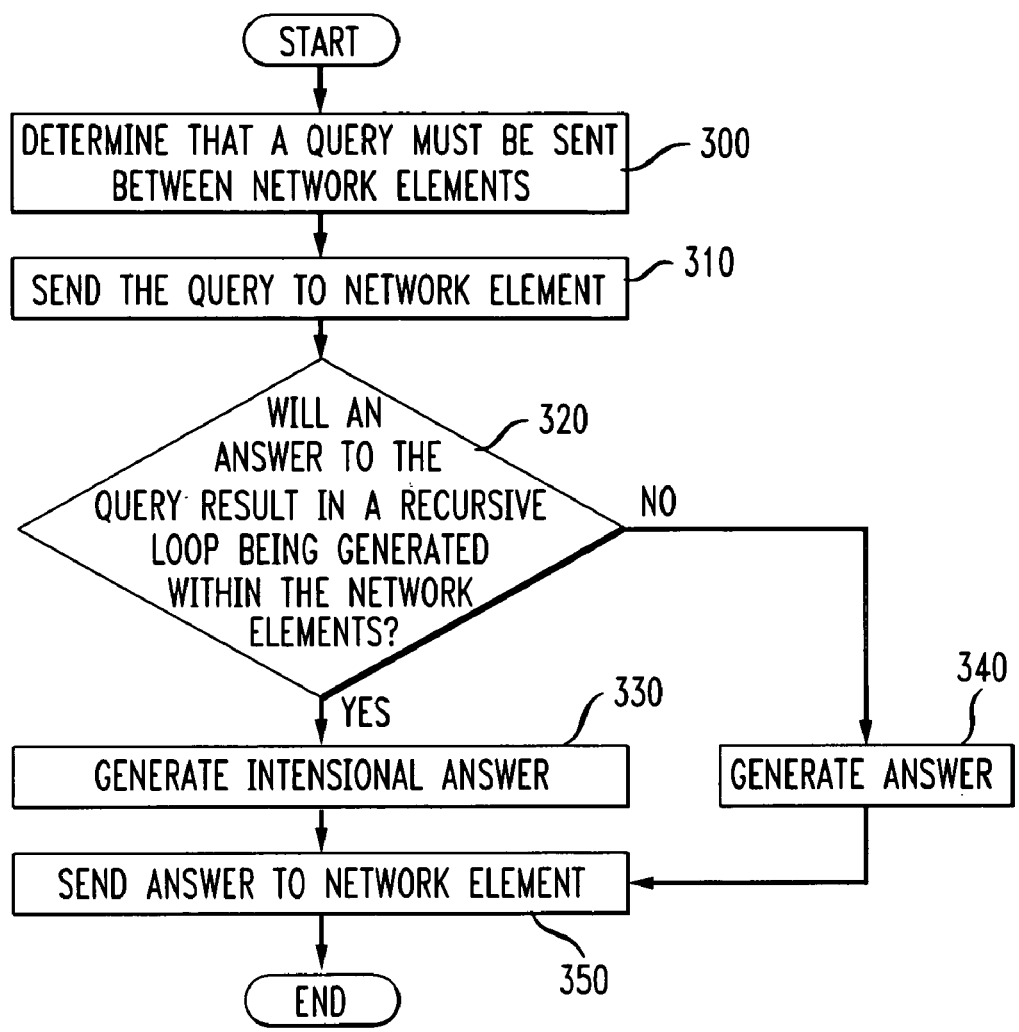
FIG. 3 is a flowchart in accordance with an embodiment of the present invention.

FIG. 3 is a flowchart illustrating steps that the systems and network elements of FIGS. 1 and/or 2 may follow in accordance with embodiments of the invention. At 300, one of the network elements determines that a query must be generated to be sent to another network element to obtain needed information. At 310 the query is sent from a first network element to a second network element. It is noted that the network elements sending and receiving the query may be included within one network, such as within one LAN, or may be in separate networks.

At 310, the receiving network determines whether computing an answer to the query could result in a recursive loop being generated between network elements, as discussed in the example discussed above. If the network element determines that a recursive loop will not be generated, at 340 an answer is generated, which may be an extensional answer as discussed above.

If the network element determines that a recursive loop will be generated, the network element, at 330, will generate an intensional answer. As discussed above, the intensional answer may contain data, but will contain at least one non-fact rule. At 350 the answer, whether intensional or extensional, is sent to the network element.

Figure 4:
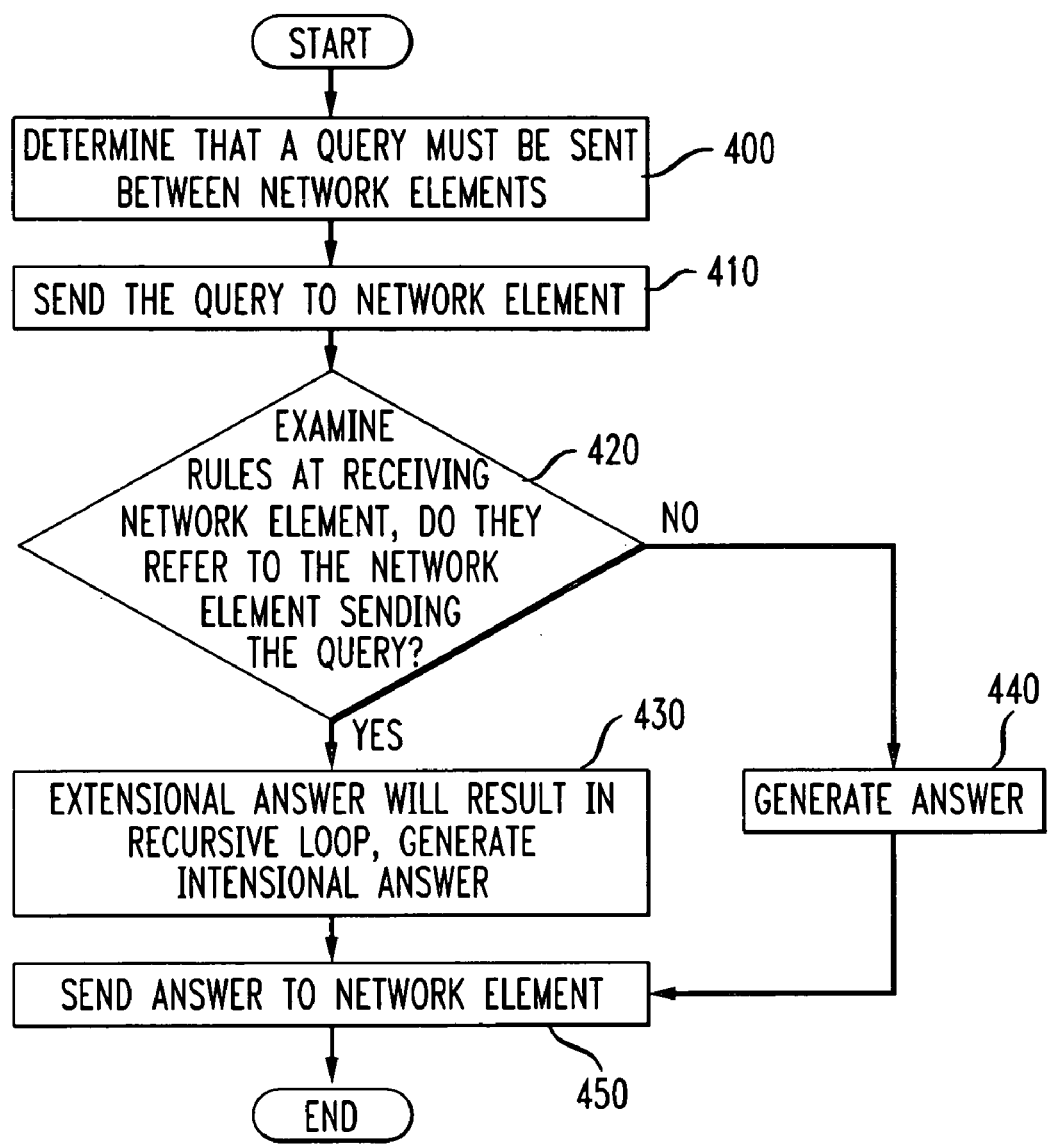
FIG. 4 is a flowchart in accordance with an embodiment of the present invention.

FIG. 4 illustrates a flowchart in accordance with another embodiment of the invention. 400 and 410 of FIG. 4 are identical to 300 and 310 of FIG. 3 described above and therefore will not be further described. At 420, after the query is received at the network element, the receiving network element examines its rules or program to see if the rules or program responsive to the query refer to the network element sending the query. If the answer is no and there is no other reason that computing an extensional answer will generate a recursive loop, an extensional answer is generated at 440.

If the rules do refer to the network element sending the query so that computing an extensional answer will generate a recursive loop, an intensional answer is generated at 430. As discussed above, the intensional answer includes non-fact rules or a program so that the recursive loop of queries between the network elements is avoided. The answer is sent to the network element at 450.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for dynamically preventing a recursive loop in a network having a plurality of network elements, comprising:
    receiving a first query from a first one of the network elements at a second one of the network elements;
    determining dynamically whether a second query from the second network element will generate a recursive loop within the network elements;
    if the second query will generate a recursive loop between the network elements, generating an intensional answer at the second network element, the intensional answer including data and at least one non-fact rule unique to at least one of said network elements that, if forwarded to the first one of the network elements, enables prevention of the recursive loop; and
    forwarding the intensional answer to the first one of the network elements.

2. The method of claim 1, wherein the intensional answer contains a program.

3. The method of claim 1, wherein if the recursive loop within the network elements will not be generated, generating an extensional answer to a query, and forwarding the extensional answer to the first network element.

4. The method of claim 1, wherein determining whether a second query from the second network element will generate a recursive loop within the network elements comprises:
    examining rules of the second network element; and
    determining whether the rules refer to the first network element.

5. The method of claim 1, wherein determining whether a second query from the second network element will generate a recursive loop within the network elements comprises: examining rules of the second network element; and determining whether the rules refer to any of the network elements involved in a query.

6. A method of dynamically resolving a recursive loop generated in response to queries between network elements in a network, comprising:

determining dynamically whether a recursive loop will be generated based on the queries between the network elements; and if a recursive loop will be generated, resolving the recursive loop by sending an intensional answer from one of the network elements to another of the network elements, the intensional answer including data and at least one non-fact rule unique to at least one of said network elements that enables resolution of the recursive loop.

7. The method of claim 6, wherein the intensional answer contains a program.

8. The method of claim 6, wherein if the recursive loop within the network elements will not be generated, generating an extensional answer, and forwarding the extensional answer to the another one of the network elements network element.

9. The method of claim 6, wherein determining whether a recursive loop will be generated within the network elements comprises:

examining rules of one of the network elements receiving a query; and determining whether the rules refer to another one of the network elements involved in the query.

10. The method of claim 6, wherein determining whether a recursive loop will be generated within the network elements comprises: examining rules of one of the network elements; and determining whether the rules refer any of the network elements involved in a query.

11. A machine-readable medium having stored thereon a plurality of executable instructions, the plurality of executable instructions comprising instructions to: receive a first query from a first one of a plurality of network elements at a second one of the plurality of network elements; determine dynamically whether a second query from the second network element will generate a recursive loop within the network elements; if the second query will generate a recursive loop between the network elements, generate an intensional answer at the second one of the network elements, the intensional answer including data and at least one non-fact rule unique to at least one of said network elements that if forwarded to the first one of the network elements, enables prevention of the recursive loop; and forward the intensional answer to the first one of the network elements.

12. The machine-readable medium of claim 11, having stored thereon additional executable instructions, the additional executable instructions comprising instructions to: examine rules of one of the network elements receiving a query; and determine whether the rules refer to another one of the network elements involved in the query.

13. The machine-readable medium of claim 11, having stored thereon additional executable instructions, the additional executable instructions comprising instructions to: examine rules of one of the network elements; and determine whether the rules refer to any of the network elements involved in a query.

14. A machine-readable medium having stored thereon a plurality of executable instructions, the plurality of executable instructions comprising instructions to: determine dynamically whether a recursive loop will be generated based on queries between network elements; and if a recursive loop will be generated, resolving the recursive loop by sending an intensional answer from one of the network elements to another of the network elements, the intensional answer including data and at least one non-fact rule unique to at least one of said network elements that enables resolution of the recursive loop.

15. The machine-readable medium of claim 14, having stored thereon additional executable instructions, the additional executable instructions comprising instructions to: generate an extensional answer, and forward the extensional answer to the another one of the network elements network element, if the recursive loop within the network elements will not be generated.

16. The machine-readable medium of claim 14, having stored thereon additional executable instructions, the additional executable instructions comprising instructions to: examine rules of one of the network elements receiving a query; and determine whether the rules refer to another one of the network elements involved in the query.

17. The machine-readable medium of claim 14, having stored thereon additional executable instructions, the additional executable instructions comprising instructions to: examine rules of one of the network elements; and determine whether the rules refer to any of the network elements involved in a query.

* * * * *